United States Patent [19]

Boesl et al.

[11] 4,433,241

[45] Feb. 21, 1984

[54] PROCESS AND APPARATUS FOR DETERMINING MOLECULE SPECTRA

[76] Inventors: Ulrich Boesl, Sommerstr. 7, 8000 München 90; Hans J. Neusser, Eggmühlerstr. 6, 8000 München; Edward W. Schlag, Osterwaldstr. 91, 8000 München 40, all of Fed. Rep. of Germany

[21] Appl. No.: 349,322

[22] Filed: Feb. 16, 1982

Related U.S. Application Data

[63] Continuation of Ser. No. 97,643, Nov. 27, 1979, abandoned.

[30] Foreign Application Priority Data

Oct. 19, 1979 [DE] Fed. Rep. of Germany ....... 2942386

[51] Int. Cl.³ .............................................. B01D 59/44

[52] U.S. Cl. .................................... 250/282; 250/283; 250/288; 250/423 P

[58] Field of Search .................... 250/423 P, 281, 282, 250/283, 288; 204/DIG. 11

[56] References Cited

U.S. PATENT DOCUMENTS 2,938,116 5/1960 Benson et al. .

3,478,204 11/1969 Brubaker et al. .

3,521,054 7/1970 Poschenriede et al. ......... 250/423 P 3,596,087 7/1971 Heath .

3,914,655 10/1975 Dreyfus et al. ................. 250/423 P 4,140,905 2/1979 Polangi ............................. 250/282

4,176,025 11/1979 Chen et al. ...................... 250/423 P 4,286,153 8/1981 Janner et al. ........................ 250/281

4,334,883 6/1982 Robinson et al. ................. 23/293 R

OTHER PUBLICATIONS

*The Review of Scientific Ins.*, vol. 37, No. 8, "Laser Used for Mass Analysis", N. C. Fenner, Aug. 1966.

*Primary Examiner*—Bruce C. Anderson

*Attorney, Agent, or Firm*—Birch, Stewart, Kolasch & Birch

[57] ABSTRACT

A process for determining molecular spectra in unseparated mixtures, in particular unseparated isotopic mixtures, which comprises allowing said mixture to successively flow through a photoreactor which is irradiated by an adjustable-wavelength laser and then through a mass spectrometer wherein the concentration of particles of specified mass is determined by variation of the wavelength of the laser or variation of the mass setting of the mass spectrometer in such a manner that a two-dimensional spectrum results having the parameters of wavelength and mass.

11 Claims, 8 Drawing Figures

PROCESS AND APPARATUS FOR DETERMINING MOLECULE SPECTRA

This application is a continuation of copending application Ser. No. 097,643, filed on Nov. 27, 1979 and now abandoned.

BACKGROUND OF THE INVENTION

The present invention relates to a process and to an apparatus for determining molecular spectra in unseparated mixtures of different molecules, particularly in molecular isotopic mixtures.

It is known that photochemical isotopic separation can be carried out using laser light. Information concerning the exact wave lengths at which the isotopes which are to be separated absorb, is extremely important for the economy of such a separation process. Heretofore two possibilities of finding these wave lengths have existed;

(a) The separation process is carried out using various wave lengths and these are varied until by chance there results an optimum separation. The wave lengths are determined by estimating the isotope shift, that is, the shift of maximum absorption, which shift results from an isotope substitution in respective molecules in comparison with other molecules which are to be separated therefrom. An optimisation of this kind by varying the actual separation process itself is time-consuming and also costly. For this reason, only a very small area of the complex molecular absorption spectrum can be examined and consequently the chance of finding an optimum wave length is small.

(b) where separate samples of isotopes are available the absorption spectra of the individual isotopes can be measured. In a few cases, such spectra can be found in the literature. A comparison of the spectra then yields the optimum wave length to be used for a separation process. This method is, however, restricted to molecules, whose isotopic spectra are either already known or else whose isotopic spectra can be obtained if they can be separated into their isotopes by means of methods other than photochemical methods. The use of other conventional separation methods which enable separation by means of the differing mass of isotopes fails however with large molecules, particularly if various types of isotopes of the same weight (isotopomers) exist. In addition, the chemical synthesis of specific molecules which are substituted with isotopes is extremely difficult and only in rare cases does this lead to a complete separation.

SUMMARY OF THE INVENTION

By means of the present invention, an apparatus and a process are provided which allow separate spectra of the individual types of molecule of the molecular mixture to be measured in an unseparated molecular mixture, particularly an unseparated isotopic mixture.

Accordingly, the present invention provides a process for determining molecular spectra in unseparated mixtures, in particular unseparated isotopic mixtures, which comprises allowing said mixture to successively flow through a photodetector which is irradiated by an adjustable-wavelength laser and then through a mass spectrometer wherein the concentration of particles of specified mass is determined by variation of the wavelength of the laser or variation of the mass setting of the mass spectrometer in such a manner that a two-dimensional spectrum results having the parameters of wavelength and mass.

The process is preferably carried out so that the relative variable velocity Ka of the laser, the changeover rate Kb of the mass spectrometer, the light pulse frequency Kc of the laser and the discharge rate Kd of the photoreactor are co-ordinated in such a way that the inequality $Ka<Kb<Kc<Kd$ is met, Ka, Kb, Kc and Kd being defined in the following manner:

(a)

$$Ka=\Delta\lambda/\Delta t/d\lambda$$

in which $\Delta\lambda/\Delta t$ represents the change in the wave length of the laser per unit time and $d\lambda$ represents the band width of the laser light at the respective adjusted wave lengths;

(b) Kb indicates how often per unit time a measuring cycle of the mass spectrometer passes, in which all the required masses are sucessively steered;

(c) Kc indicates how many light impulses the laser delivers per unit time; and (d)

$$Kd=C/V\cdot 1/[1n(P_1/P_2)]$$

in which C is the gas dynamic conductivity of the photoreactor, V is the volume of the photoreactor, $P_1$ is the pressure on the high pressure side of the photoreactor and $P_2$ is the pressure on the low pressure side of the photoreactor.

The rates Ka, Kb, Kc and Kd preferably have the dimension $sec^{-1}$; the band width $d\lambda$ preferably has the dimension Å wherein the change in the wave length per time unit $\Delta\lambda/\Delta t$ thereby has the dimension Å/sec; the gas dynamic conductance C preferably has the dimension liter/sec, and the volume V has the dimension liter.

It should be noted that mass change-over and the pulsed light source can optionally be omitted.

However, with the aid of the cyclic mass setting, the specific molecular spectra of several components of the mixture are obtained simultaneously. The pulsed light source if used produces a temporarily modulated concentration of those molecules capable of absorption and also of the resulting photo products obtained by means of this photochemical process. It is also used for discriminating interfering foreign signals.

The process according to the present invention can be carried out in two embodiments. In one embodiment, the intensity of the laser beam is adjusted to such a low level and the laser wavelength is chosen so that only dissociation of the molecules occurs in the photoreactor. In another embodiment of the process according to the present invention, the intensity of the laser beam is adjusted to such a high level and the laser wavelength is chosen so that only ionisation of the molecules occurs.

The former embodiment of the process according to the present invention is suitable for all molecules which are present in gaseous form and which dissociate particularly predissociate by absorption of a photon. For this purpose, as afore mentioned, laser light is used, the intensity of which is adjusted to such a low level that only dissociated and no ionisation results by the application thereof. The wave length of the laser is coordinated within a spectral range in which the molecules have a structured spectrum. In this particular embodiment the photoreactor vessel is in the form of a flow tube. The length and diameter of the flow tube as well as the laser intensity are co-ordinated so that within the mass spectrometer, the pressure does not exceed $10^{-5}$ torr, so that a measurable dissociation level is obtained in the flow tube and also so that the discharge rate Kd of the flow tube allows the measurement of the spectrum in the shortest possible time. With a practical apparatus lay out, for example, the rate Kd=12 ($sec^{-1}$), the mass flow equals $10^{-5}$ (torr. liter/-sec) and the laser capacity equals 300 mW with a laser light beam diameter of 3 mm. In addition, the co-ordination of the rates Ka, Kb, Kc, Kd is such that Ka:Kb:Kc:Kd:=1:5:50:150 holds true.

The latter embodiment, mentioned above, is also suitable for all molecules which are available in gaseous form. Laser light is again used in this embodiment here, and its intensity is so high that by means of a non-linear absorption process of low, mostly secondary order, the molecules are ionised, but non-linear processes of a higher order, which could cause additional dissociation, do not occur, to any noticeable extent. The wave length of the laser which is used or alternatively the differing wave lengths of several adjustable lasers are selected so that molecules are firstly stimulated and then are ionised by one or more other absorption steps, whereby the molecules are only stimulated just over the ionization threshold. This means they do not dissociate and the particularly favourable characteristics of the ions which are mentioned below, are obtained. They are thus suitable for mass spectrometric detection in a particularly advantageous way.

In this second embodiment of the process according to the present invention, the reaction vessel consists of a receptacle which is provided with a device for producing a molecular beam, for example it may be provided with a nozzle. At right angles to this molecular beam, a commercial mass spectrometer is built into said receptacle in which spectrometer the electron impactionisation chamber is replaced by an ion optical element, through which the molecular beam passes. The laser beam is focused in this molecular beam so that ions result within the ion optical element and are then steered thereby into the mass spectrometer. A sufficient light intensity may be obtained, for example, with pulsed lasers and by focusing the laser light beam by means of an optical element. The ion source, produced in this way is in the form of a point and possesses characteristics, with regard to spacial expansion, of the ion energy and temporal clearance, which are so favourable that it makes possible an improvement in customary mass spectroscopy. The slight spacial expansion allows the production of a very good ion-optical image, and the laser-stimulation which is just over the ionisation threshhold produces mono-energetic ions. Both of the above are conditions which play an important part, for example, in mass spectrometry involving high mass resolution. When pulsed lasers having pulse durations of a few nanoseconds are used, a pulsed ion source is additionally obtained, the ions of which are correlated in time within a few nanoseconds.

Thus, it is common to both embodiments of the process according to the present invention that a continuous molecular flow is produced from gaseous vapour mixtures of molecules, particularly from a mixture of chemically similar, but isotopically different molecules, wherein the mixture is continuously fed into an evacuated chamber from a supply vessel and the mixture thus fed into the chamber is also continuously discharged from the chamber.

In both embodiments of the process according to the present invention, the continuous molecular flow is subjected to a photoreaction, which photoreaction in the first embodiment is a pure dissociation of molecules, while in the second embodiment, it is a pure ionisation of molecules. According to the embodiments of the process of the present invention, the molecules are thus dissociated or ionised, by irradiation by means of a laser which is continually adjustable in its wave length.

Finally, the molecules pass to a mass spectrometer for analysis in which, in the first embodiment of the process of the present invention, it is necessary to ionise the molecules and the molecular fragments which have resulted from dissociation in the photoreactor, before mass spectrometric separation by electron impact ionisation, while in the second embodiment of the process of the present invention, it is sufficient for the ions formed in the photoreactor to be carried directly to the mass spectrometer by means of a suitable ion optical element, without the spectrometer needing to have an ionisation device, since the photoreactor itself already serves as an ionisation chamber.

An apparatus for carrying out both embodiments of the process according to the present invention, with which molecule spectra can be measured, comprises:

(a) an adjustable-wave length laser;

(b) a photoreaction vessel, the interior of which is in the path of the laser beam and which has an inlet and outlet;

(c) a device, connected to said inlet of the photoreaction vessel, for supplying unseparated molecular mixtures, particularly isotopic mixtures, into the photoreaction vessel; and (d) a mass spectrometer, connected to said outlet of said photoreaction vessel, having a vacuum pump.

If the first embodiment of the process according to the present invention is carried out with the above apparatus of the present invention, then the photoreaction vessel is in the form of a flow tube, which is passed through in the direction of the laser beam, and the length and diameter of which are selected so that a measurable dissociation level is achieved during the flow.

If on the other hand, the second embodiment of the process according to the present invention is carried out with the above apparatus, of the present invention, then the photoreaction vessel is provided with a device for producing a molecular beam, preferably a nozzle, whereby the molecular beam is directed perpendicularly to the laser beam.

With this latter arrangement, the photoreaction vessel can contain an ion optical element and can form together with this the ion source of the mass spectrometer. The laser light can in particular be focused in the form of a point on the molecular beam in the ion optical element.

Thus the present invention also provides an ion source, especially for use in mass spectrometers having a laser arrangement for producing a pulsed laser beam, which laser is adjustable in wave length and which can be focused on a molecular or atom beam, comprising:

(a) a continuously dischargeable housing having a gas inlet pipe projecting into the housing and which has a nozzle on the end thereof for producing the molecular beam or atom beam;

(b) windows and a focusing optical element for the laser beam; and (c) a first electrode for repelling the ions produced in the focus and at least one other element for attracting these ions, each electrode having an open passage for the ions.

In particular this ion source can be formed so that the casing is connected in air-tight manner with the housing of an ion consumer, for example that of a mass spectrometer, or is integrated therein.

Furthermore, the laser arrangement of the ion source of the present invention can be formed in such a manner that the laser beam can be focused on the point of intersection of the molecular beam and the axis of the open passage. Other laser arrangements can also be provided for producing laser beams which can be focused on the previously mentioned intersection point.

Finally, the present invention also provides, a flight time-mass spectrometer having an ion source of the previously mentioned kind, in which according to the present invention only one distance tube determining the flight route of the ions is arranged between the ion source and a measuring device detecting the ions as well as their transit time.

The present invention also provides the use of an ion source of the kind described above, with installations for "ion" implantation.

BRIEF DESCRIPTION OF THE DRAWINGS

The above advantages and characteristics of the present invention, as well as others, are described in more detail in the following description with reference to FIGS. 1 to 8 of the accompanying drawings.

DETAILED DESCRIPTION OF THE PREFERRED EMBODIMENT

Figure 1:
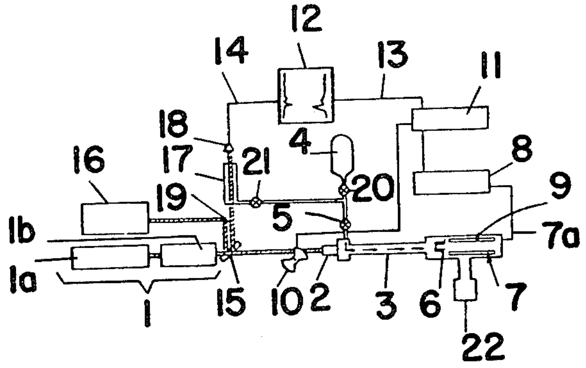
FIG. 1 shows an embodiment of an apparatus for carrying out the first embodiment of the process according to the present invention mentioned above.

The pulsed source of laser light 1, which is continuously adjustable in its wave-length, irradiates the interior of a flow tube 3 through a window 2. The molecular mixture which is to be examined flows out of the supply vessel 4, which is itself impervious to light, and in which the sample is present in the form of a gas, near to window 2 into the flow tube 3. The flow is controlled by the metering valve 5. As shown in FIG. 1 by the arrows, the molecules pass directly into the ionisation chamber 6 of a mass spectrometer 7 after flowing through the flow tube 3. By way of example, the source of laser light can consist of an $Ar^+$-Laser 1_a_ and dye laser 1_b_.

A part of the light emitted from the dye laser 1_b_ is diverted via a beam splitter 15 and a reflector 19 for controlling the wave length into a 1.5 m spectrograph 16 (Jogin Yvon THRP). The main part of the laser light passes into the flow tube 3 and causes a photoreaction of the in-flowing molecules. Parent molecules and photoproducts thereof are ionised in the mass spectrometer 7, which is formed for example as a quadrupole-mass-analyser (QMA), and are separated according to mass and measured with a particle multiplier (not shown). The QMA-electronics 8 steers the mass filter 9 of the mass spectrometer 7 onwards and supplies the cathodes, which emit electrons, the ion optical element and the multiplier of the mass spectrometer 7.

For PD-spectra, the mass spectrometer 7 is driven in a stationary way, that is, the filter system 9 is adjusted to a determined mass. The QMA-electronics 8 can indeed switch the filter system 9 to and fro at time intervals of 0.5, 1,2,4 and 8 seconds between a maximum of four masses. Thereby, a simultaneous tracking of the photo reaction, being dependent on the wave length, of different molecules (for example, isotopic molecules) is made possible.

A light-beam chopper 10 is provided for pulsing the laser. Very similar or even the same molecular fragments often result both by means of photo dissociation and also by electron impact. In order to be able to differentiate between both kinds of fragments, the light and thereby the concentration of the photo products is modulated with the aid of the light-beam chopper 10. The modulated proportion of the ion signal is intensified by a "Lock-in-amplifier" 11 and then retransmitted onto one channel (13) of a two-channel-x-t-recorder 12.

The normal absorption spectrum of the gaseous sample is registered on the second channel 14 of this recorder 12. In addition, part of the laser beam is split out via the beam splitter 15, sent through an absorption cell 17 and then measured by a photodiode 18. The light has, of course, to be weakened in front of the cell by means of filters to such an extent (approx. 1 $\mu$W), that the photoreaction taking place can be neglected.

An outlet valve 20 or inlet valve 21, is provided on both the supply vessel 4 and at the inlet of the absorption cell 17. A vacuum pump 22 is used for discharging the mass spectrometer 7 and for continuously pumping out the molecules supplied by the flow tube 3.

The vacuum in the mass spectrometer 7 is less than $10^{-5}$ torr and is maintained by the vacuum pump 22. The ion flow signal is decreased via the signal conductor 7_a_, dependent upon the wave length of the laser light and also on the adjustment of the mass spectrometer 7. In a particular case, the dimensions of the flow tube 3 are for example length 25 cm, diameter 0.6 cm and the distance from the tube end to the ionisation chamber 6 is 1 cm. Apart from the flow tube 3, all the individual components of the apparatus are known per se from modern laser and vacuum technology.

The light-beam chopper 10 and the mass changeover switch of the mass spectrometer 7 can naturally be used simultaneously or one or the other can be used for measuring. The light chopper 10 is required above all for the spectra of photo products.

Figure 2:
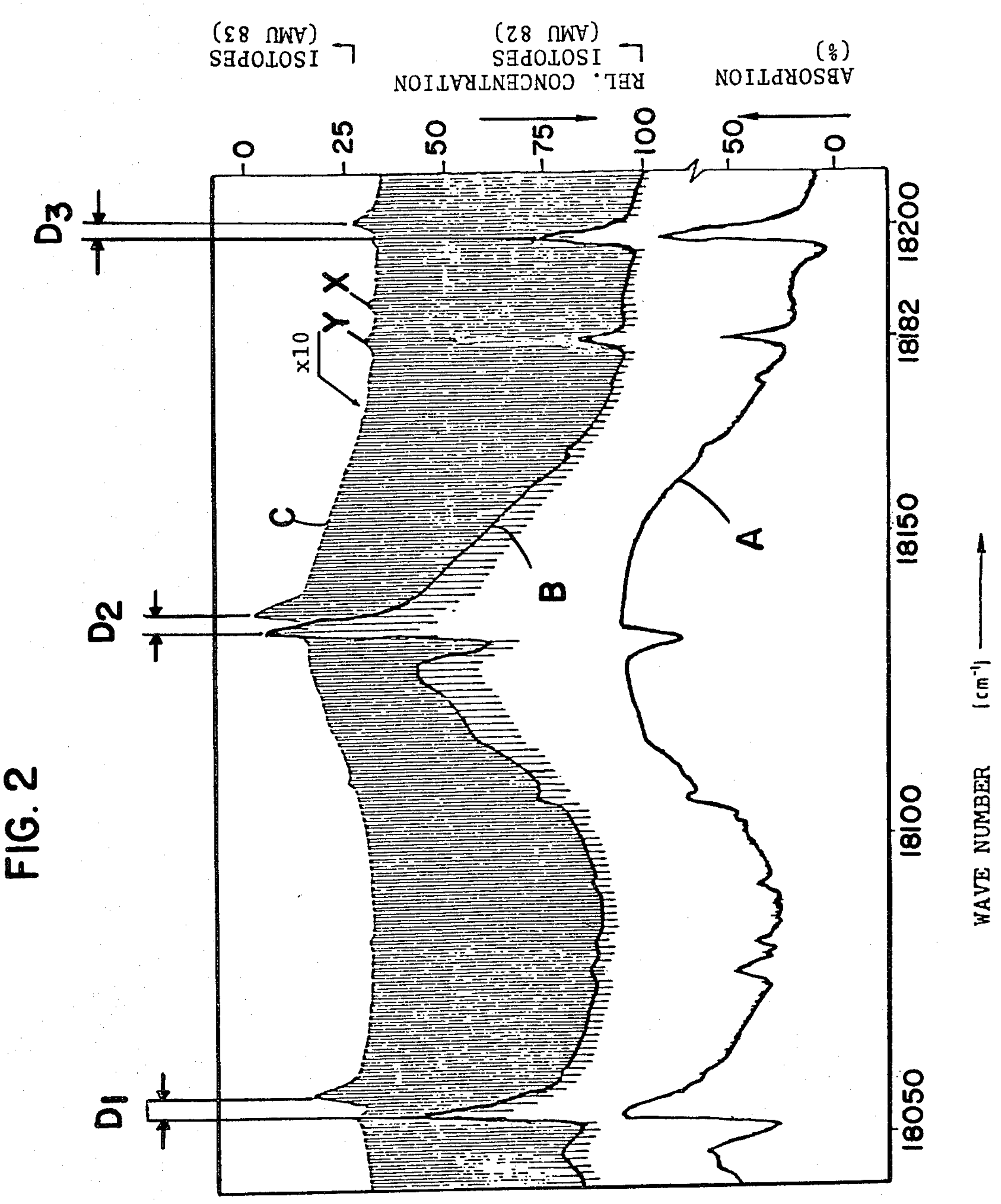
FIG. 2 shows an example of molecular spectra, which are obtained by using the apparatus according to FIG. 1.

FIG. 2 shows the result of using the process of the present invention on a molecule which is to be examined:

Sym-tetrazine ($H_2C_2N_4$,) is an aromatic molecule (which is abbreviated in the following to ST), in which four carbon atoms of a benzene ring are replaced by four nitrogen atoms, in such a manner that the remaining two carbon atoms and hydrogen atoms are left in para positions. ST meets the basic requirements for the process of the present invention. It predissociates when irradiated with light having a wave length of about 5500 Å (approximately 18170 $cm^{-1}$) and at room temperature has a vapour pressure over solid substance of 1 torr. The parts of the spectra shown in FIG. 2 are measured on the unseparated natural isotopic mixture, in which the following molecule-isotopic types, to be separated from each other, appear most frequently:

| | | |
|---|---|---|
| $H_2{}^{12}C_2{}^{14}N_4$ | 96,3% | 82 [AMU] |
| $H_2{}^{12}C^{13}C^{14}N_4$ | 2,2% | 83 [AMU] |
| $H_2{}^{12}C_2{}^{15}N^{14}N_3$ | 1,4% | 83 [AMU] |

In the above, this, the notation "AMU" represents Atomic Mass Unit. The middle spectrum B belongs to the light ST (82 AMU), the top spectrum C (increased by factor 10) belongs to all heavy isotope types with 83 AMU. The bottom spectrum A is a conventional absorption spectrum, which is shown for comparative purposes. The wave length of laser 1*b* or the energy of the stimulating photons is plotted on the x-axis in wave numbers [$cm^{-1}$] the relative concentration of the isotope types is plotted, going down, on the y-axis with 83 AMU and 82 AMU, and absorption is also plotted in % for the bottom line or for the bottom spectrum A, going upwards.

The top spectrum C shows clear isotopic shifts of the bands of the heavy isotope types of $D_1$,$D_2$ and $D_3$ of approximately 3 $cm^{-1}$ compared with the bands of the most frequent light isotope type in spectrum B below. These shifted isotopic bands cannot be observed in the normal absorption spectrum A, as they are completely covered by substantially heavier bands of the type of light isotope which is approximately 30 times more frequent.

Also, bands X and Y approximately show at 18182 $cm^{-1}$ a differing isotope shift for $13_C$ and $15_N$ doped sym-tetrazine and this presents the possibility of separating both isotopomers photochemically. Band X is associated with the atomic mass number 83 with $13_C$, while band Y is associated with mass number 83 with $15_N$.

Figure 3:
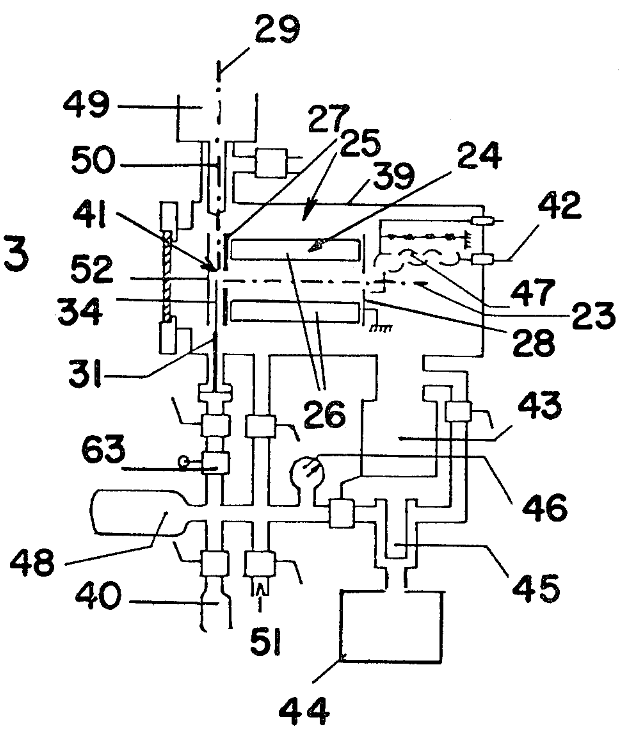
FIG. 3 shows an embodiment of an apparatus for carrying out the second embodiment of the process according to the present invention mentioned above.
Figure 4:
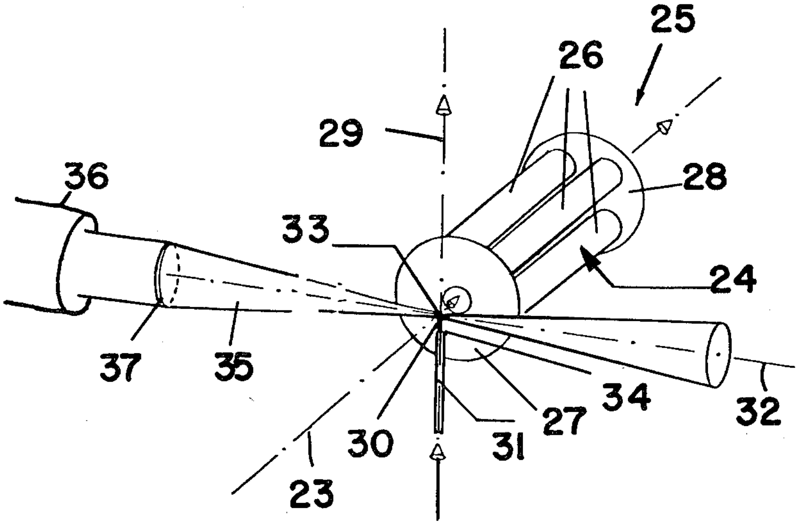
FIG. 4 shows a perspective view of the beam path of the laser arrangement, the passage of the molecular beam and the mass spectrometric system of the apparatus according to FIG. 3.
Figure 5:
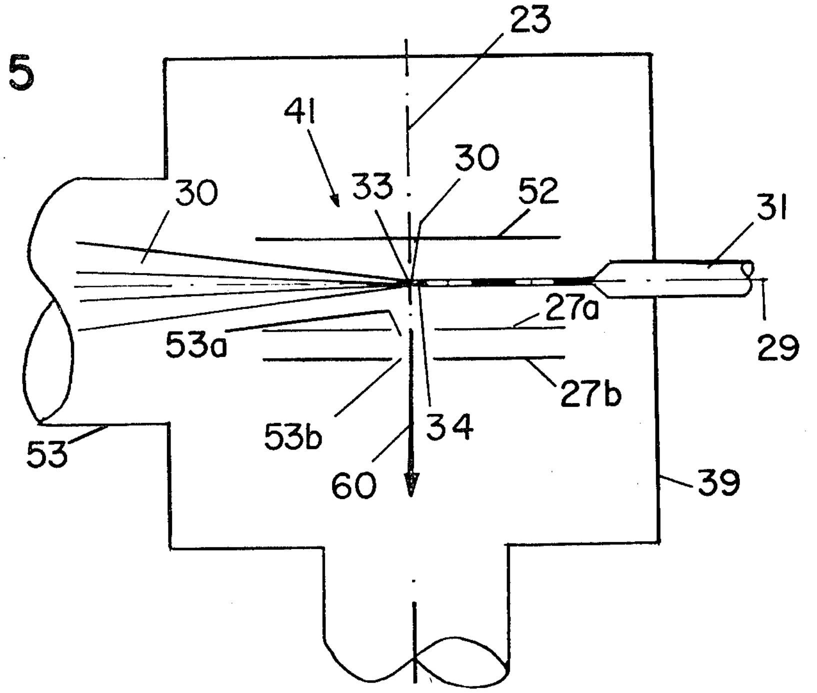
FIG. 5 shows schematically the structure of an ion source according to the present invention in a plane, established by the ion flight direction and the molecular beam.
Figure 6:
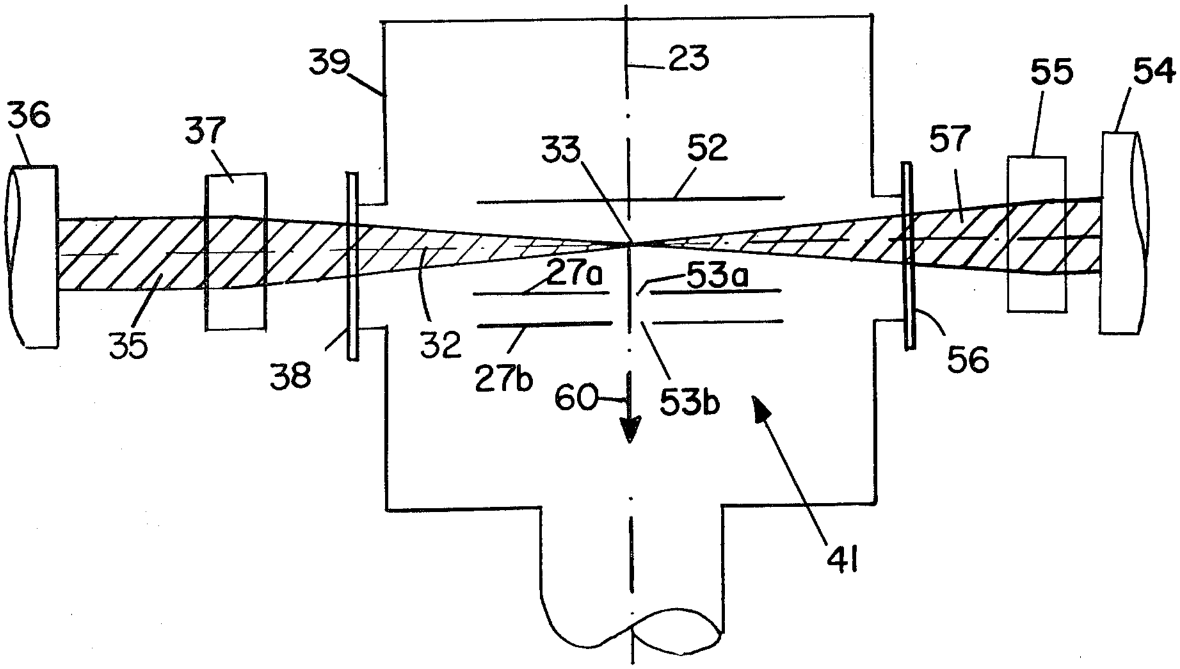
FIG. 6 shows schematically the arrangement according to FIG. 5 in a plane determined by the ion flight direction and the laser beam.
Figure 7:
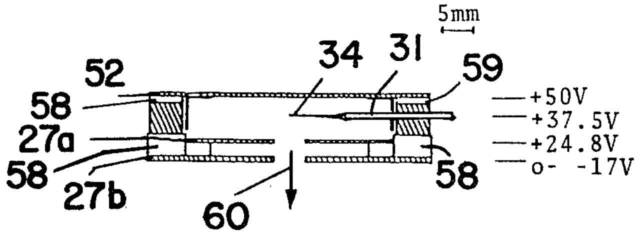
FIG. 7 shows a section through an exemplary embodiment of the ion source according to the present invention.

Next, reference is made to FIGS. 3 and 4 which show another embodiment of an apparatus according to the present invention. Reference is also made to FIGS. 5, 6 and 7 which show an ion source which is particularly well suited to this particular embodiment.

FIG. 4 shows the principle of construction. On an axis 23 (ion axis) is situated the filter system 24 of a quadruple-mass spectrometer 25, consisting of four bars 26, an entrance aperture 27 and an exit aperture 28 (see also FIG. 3). The axis 29 of a molecular beam 30 is in the vertical direction, which beam starts at the end of a nozzle 31 near the entrance of the mass filter. The ionising light 35 is radiated along the axis 32, perpendicular to the two axes 23 and 29 which are themselves perpendicular to each other. The light is bundled and adjusted precisely so that the focus thereof 33 meets the outflowing molecules immediately in front of the nozzle opening 34. At the focus the photon flow density is large enough to make possible two-photon-ionisation, which is quadratically dependent on the light intensity. The overlap area between the focus 33 and the molecular beam 30 is called the ionisation-area. The ions which result there are directed through an ion optical element into the mass filter 24 which is not shown in FIG. 4 for clarity reasons.

FIG. 3 shows a section through the apparatus along the plane defined by the axes 23 and 29, FIG. 5 shows a section along the same plane through the ion source, while FIG. 6 shows a section through the ion source along the plane which is defined by the axes 23 and 32.

The pulsed laser light source 36, which is continuously adjustable in wave length, thus produces a laser beam 35, which with the help of a focussing optical element 37, is focussed through a window 38 (see FIG. 6) into the receptacle 39 so that the focus lies within the molecular beam 30. This molecular beam is continuously maintained from the supply vessel 40 via a buffer container 48 and a metering valve 63 and is produced through the nozzle 34. The arrangement for producing the molecular beam is arranged so that the beam passes through the ion optical element 41. This ion optical element is assembled, instead of a customary ion chamber, in front of the inlet opening of the mass spectrometer 25. The molecular beam 30 and the laser focus 33 are adjusted so that the originating source of the ions (photo ion source) is directly in front of the inlet opening of the mass spectrometer 25. The ion optical element 41 then directs the photo ions into the mass spectrometer 25, where they can be analysed according to their mass and then be identified via a secondary electron multiplier 47 on the signal cable 42 as an ion flow. The vacuum in the receptacle 39 is maintained by a vacuum pump and should not exceed $10^{-5}$ torr; this vacuum pump, for example, consists of an ion getter pump 43 and a two-stage rotary vane pump 44. This discharge system is completed with a cooling trap 45 and a pressure gauging device 46.

49 represents a container for liquid nitrogen and 50 represents a cooling finger; in 51, nitrogen gas can be supplied for flooding the installation.

This ion source, which is also suitable for other uses, is explained in more detail in the following with reference to FIGS. 5 to 7.

The ion source, shown in FIGS. 5, 6 and 7 is usually kept in a continuously dischargeable housing that is the receptacle 39. Into this leads the gas inlet pipe 31, through which gas flows to the nozzle 34, which nozzle consists for example of a hollow needle with an interior diameter of approximately 0.2 mm and is 25 mm long. The nozzle 34 projects radially into an electrode arrangement, which is formed from a discoid, ion-repelling electrode 52 and two aperture-like, ion attracting electrodes 27*a* and 27*b*, which are arranged parallel to the formal electrode, each having an open passage 53*a*, 53*b* which are each preferably circular. Behind the nozzle 34, there develops a molecular beam 30. The nozzle 34, which is arranged parallel to the first electrode 52, is at a distance of, for example, 3 mm from said electrode, and the end thereof is preferably at a distance of 0.5 mm from the axis 23 of the open passage 53*a* of electrode 27*a*. Using this arrangement, a high molecular density is obtained at the intersection point of the molecular beam 30 with the axis 23 of the opening passages 27*a*, 27*b* at the smallest possible gas flow rate. The molecular beam 30 is directed precisely into the suction opening of a vacuum pump connected by 53, so that the vacuum in the receptacle 39 is charged to as little an extent as possible and according to the use of the ion chamber suffices from $10^{-3}$ torr up to ultra high vacuum. This vacuum should be better than $10^{-5}$ torr, as was mentioned above, for mass spectrometer arrangements.

The laser beam 35 runs perpendicularly to the expansion direction of the molecular beam 30 and to the axis of the passage opening 27*a*. It is produced by the pulsed laser light source 36, which is continuously adjustable in wave length, particularly by means of a dye laser, and is focussed by means of the focussing optical element 37 through the inlet window 38 in the receptacle 39 into the molecular beam 30 so that the focus 33 is preferably 0.5 mm in front of the nozzle 34 and thereby is on the axis 23 of the passage opening 27*a*. The wave length of the laser light can be both in the visible as well as in the UV-range; however, both the absorptivity behaviour as well as the lowest ionisation potential of the molecule to be ionised have to be considered in choosing the wave length used, in order to obtain good ion yields.

In order to achieve a broad applicability of this ion source on most of the possible types of molecule, the use of other lasers, particularly of another pulsed laser 54, can be advantageous. By the synchronised time cooperation of the two laser beams 35 and 57 and by their adjustment on to the molecular-specific absorptivity behaviour, an ionisation can also be produced in molecules which are non-ionisable when using only one laser beam. For this, the foci of the first and second laser beam 35 and 37 have to overlap. This is achieved for example, when the second laser beam 57 lies in the plane which is defined by the laser beam 35 and the molecular beam 30, and is focussed in the opposite direction to the laser beam 35 through a second window 56 with a second focussing optical element 55 into the molecular beam 30. Both foci are covered by precise adjustment of this focussing optic 55.

The electrodes 52 and 27*a* are at a distance of, for example, 7 mm and the electrodes 27*a* and 27*b* are at a distance of, for example, 2 mm. The open passages 53*a*, 53*b* have, for example, a diameter of 5 mm. All the electrodes have a total exterior diameter of for example 45 mm, and they are preferably made out of stainless steel. Spacing pieces 58, 59 between the electrodes and insulations for the voltage supply are made of ceramics. By the combination of electrodes 27*a* and 27*b*, the ions are drawn out of the focus 33 and are weakly focused in the ion flight direction 60. Drawing out the ions can also be carried out by electrode 27*a* alone. The electrodes 52, 27*a* and 27*b* and the nozzle 34 are put on potential so that the nozzle 34 disturbs the development of rotation-symmetrical equipotential surfaces between the electrodes 52 and 27*a*, 27*b* as little as possible. Optimisation of the potentials takes place by adjusting the applied voltages to the maximum ion flow. The potential gradient between electrode 52 and the exterior electrode 27*b* is preferably varied between the values −50 and −100 V for optimising the ion flow, whereby the exterior electrode 27*b* has the lowest potential. A set of optimum voltages are for example +50 V at electrode 52, +37.5 V at nozzle 34, +24,8 V at electrode 27*a* and 0 to −10 V at electrode 27B.

Figure 8:
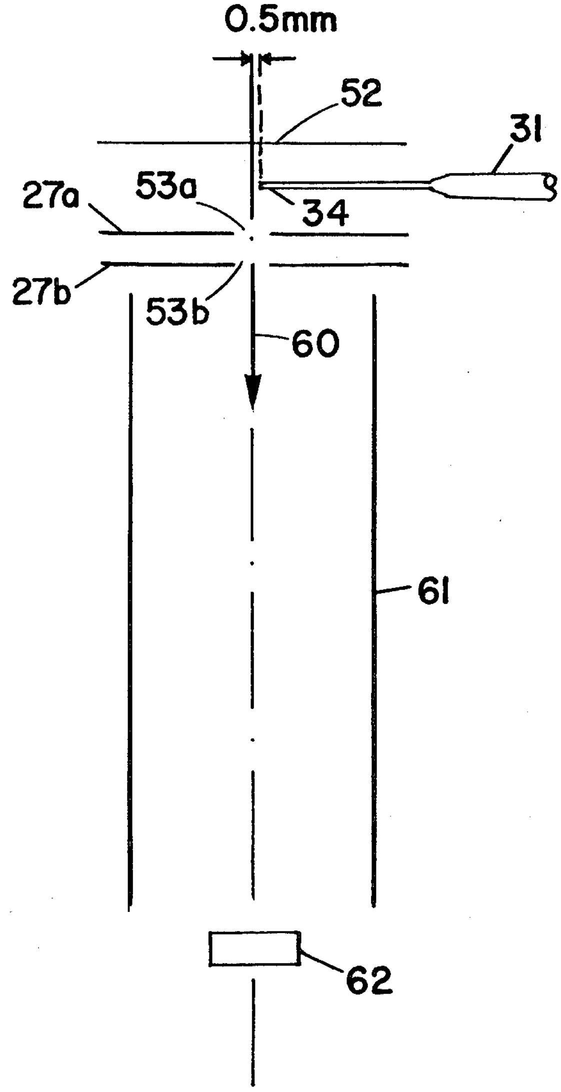
FIG. 8 shows schematically a section through a flight time-mass spectrometer according to the present invention having an ion source according to the invention.

The ion source shown in FIGS. 5, 6 and 7 can be extended into a flight time mass spectrometer of a particularly simple construction according to FIG. 8. For this, the following characteristics of the described ion source are exploited:

(a) Since a pulsed laser light source is used, which produces very short, for example 8 ns long light impulses, all the ions result simultaneously at an exactly defined time.

(b) Determined by the good focussing characteristics of laser light, the ions result in very small volume, so that all the ions are at the same starting potential. Moreover, the ions thus produced can be refocussed back to small volumes by using simple means.

(c) Since monochromatic laser light is used and the wave length can be adjusted to the specific requirement of ionisation potential for molecule type, the resulting ions are monoenergetic.

Therefore, since all the ions are produced under the same starting conditions, as regards time, place and energy, a solid flight route of for example 30 cm can be established by a pipe 61, and a measuring device 62 for detecting the ions and their flight time and consequently, these are the only additional requirements for constructing a flight time mass spectrometer.

The flight time differences Δt1 of the ions, the shortest receivable time Δt2 of the measuring device 62 and the time spread, that is, the width of the time interval within which ions of the same type arrive at the measuring device 62, Δt3 which spread is produced for example by the duration of the laser impulse or else by inhomogoneities of the removal field, have to be adjusted so that the following relation is mat:

$$\Delta t3 \leqq \Delta t2 < \Delta t1$$

Due to the characteristics mentioned above under points (a), (b) and (c), the ion source according to the present invention is also suitable for other high resolution mass spectrometers having high ion yields as well as for ion implantation installation. For the last mentioned use, the molecular beam would generally have to be replaced by an atom beam.

Particularly when using the ion source according to the present invention for a flight time mass spectrometer, it should be noted that the density of the molecules in the molecular beam is kept so low that no thermal heating-up takes place in the focus, since if this occurs then the resulting ions are no longer monoenergetic.

What is claimed is:

1. An apparatus for determining molecular spectra, comprising:

(a) a photoreactive vessel having a supply tube with an inlet and an outlet, the outlet forming nozzle means for producing an effluent molecular beam directed into said vessel;

(b) means connected to the inlet of said supply tube for supplying unseparated mixtures of molecules having a structured spectrum, particularly isotopic mixtures, to said supply tube, the said molecular beam being comprised of said mixtures;

(c) Adjustable wavelength laser means for producing a laser beam directed perpendicularly to and focused to a point on the molecular beam within said photoreaction vessel, said laser working within a spectral range included in the said structured spectrum and having an intensity to perform stimulation of selected molecules included in said molecular beam just above the ionization threshold thereof by at least two absorption steps to form ionized selected molecules;

(d) electrode means arranged in the said photoreaction vessel comprising electrodes positioned at both sides of the point of the molecular beam to which the laser beam is focused, for forming a beam of the ionized molecules directed perpendicularly to said molecular and laser beams; and (e) a mass spectrometer connected to the said photoreaction vessel receiving the beam of ionized molecules, the said mass spectrometer having a vacuum pump for evacuating the interior thereof, whereby the geometrical relationship between said laser beam, molecular beam and said beam of ionized molecules causes the immediate separation of ionized molecules from unionized molecules within the photoreaction vessel and enhances the ionization efficiency of said photoreaction vessel.

2. An apparatus according to claim 1, wherein said laser means produces a pulsed laser beam and said mass spectrometer is a time-of-flight mass spectrometer.

3. An apparatus according to claim 1, wherein said electrode means comprises at least a first electrode on one side of said point with an electrical potential thereon for repelling said ionized molecules toward said mass spectrometer and at least one other electrode on the other side of said point with a potential thereon for attracting said ionized molecules toward said mass spectrometer, said other electrode having an aperture therein for accommodating the flow of said ionized molecules into said mass spectrometer.

4. An apparatus of claim 3, wherein said nozzle means has a potential thereon which does not disturb the flow of ionized molecules from said point through said aperture in said other electrode into said mass spectrum.

5. An apparatus of claim 1, wherein said photoreaction vessel has an outlet port formed therein connected to a vacuum source, said outlet port being disposed directly opposite to and on the same axis with said nozzle means, whereby portions of said molecular beam which are not selectively ionized at said point are drawn by said vacuum source directly into said output port.

6. The method of claim 5, comprising the further steps of:

(a) providing a vacuum source connected to an output portion in said reaction vessel opposite to said nozzle means and on said first axis; and (b) operating said vacuum source to withdraw unionized portions of said molecular beam from said photoreaction vessel.

7. A method for determining molecular spectra of isotopic mixtures comprising the steps of:

(a) introducing unseparated isotopic mixtures of molecules having a structured spectrum through a nozzle means to form an effluent molecular beam;

(b) directing said molecular beam from said nozzle means into a photoreaction vessel along a first axis;

(c) directing a laser beam along a second axis substantially perpendicular to said first axis within said photoreaction vessel;

(d) focusing said laser beam to a point within said molecular beam;

(e) adjusting the wavelength of said laser beam within a spectral range included within said structured spectrum;

(f) adjusting the intensity of said laser beam to perform stimulation of selected molecules in said molecular beam to energy levels just above the ionization threshold thereof by at least two absorption steps to ionize said selected molecules;

(g) accelerating the selected molecules so ionized along a third axis in said reaction vessel perpendicular to a plane formed by said first and second axes;

(h) providing a mass spectrometer on said third axis for determining the concentration of selected masses of said ionized selected molecules; and (i) correlating said mass concentrations of the selected wavelengths of said laser beam to produce a two-dimensional molecular spectra having parameters of wavelength and mass, whereby the geometrical relationship between said laser beam, molecular beam and said beam of ionized molecules causes the immediate separation of ionized molecules from unionized molecules within the photoreaction vessel and enhances the ionization efficiency of said photoreaction vessel.

8. An apparatus for producing an ion beam comprising:

(a) a photoreaction vessel having a supply tube with an inlet and an outlet, the outlet forming nozzle means for producing an effluent molecular beam directed into said vessel;

(b) means connected to the inlet of said supply tube for supplying unseparated mixtures of molecules having a structured spectrum to said supply tube, the said molecular beam being comprised of said mixtures;

(c) adjustable wavelength laser means for producing a laser beam directed perpendicularly to and focused to a point on the molecular beam within said photoreaction vessel, said laser working within a spectral range included in the said structured spectrum and having an intensity to perform stimulation of selected molecules included in said molecular beam just above the ionization threshold thereof by at least two absorption steps to ionize said selected molecules; and (d) electrode means arranged in the said photoreaction vessel comprising electrodes positioned at both sides of the point of the molecular beam to which the laser beam is focused, for forming a beam of the ionized molecules directed perpendicularly to said molecular and laser beams, whereby the geometrical relationship between said laser beam, molecular beam and said beam of ionized molecules causes the immediate separation of ionized molecules from unionized molecules within the photoreaction vessel and enhances the ionization efficiency of said photoreaction vessel.

9. An apparatus to claim 8, wherein said electrode means comprises at least a first electrode on one side of said point with an electrical potential thereon for repelling said ionized molecules in said perpendicular direction and at least one other electrode on the other side of said point with a potential thereon for attracting said ionized molecules in said direction, said other electrode having an aperture therein for accommodating the flow of said ionized molecules therethrough.

10. An apparatus according to claim 8, wherein said nozzle means has a potential thereon which does not disturb the flow of ionized molecules from said point through said aperture in said other electrode.

11. An apparatus according to claim 9, wherein said photoreaction vessel has an outlet port formed therein connected to a vacuum source, said outlet port being disposed directly opposite to and on the same axis with said nozzle means, whereby portions of said molecular beam which are not selectively ionized at said point are drawn by said vacuum source directly into said output port.

* * * * *